United States Patent [19]

Shigematsu et al.

[11] Patent Number: 4,619,629

[45] Date of Patent: Oct. 28, 1986

[54] HYDRAULIC PRESSURE CONTROL APPARATUS FOR A CONTINUOUSLY VARIABLE TRANSMISSION

[75] Inventors: Takashi Shigematsu; Setsuo Tokoro; Tomoyuki Watanabe, all of Susono, Japan

[73] Assignee: Toyota Jidosha Kabushiki Kaisha, Japan

[21] Appl. No.: 606,523

[22] Filed: May 3, 1984

[30] Foreign Application Priority Data

Jul. 26, 1982 [JP] Japan ................................. 57-128878
Jul. 26, 1982 [JP] Japan ................................. 57-128880

[51] Int. Cl.⁴ ........................................... F16H 11/06
[52] U.S. Cl. ........................................ 474/28; 474/18
[58] Field of Search ...................... 474/28, 18, 11, 12, 474/8

[56] References Cited

U.S. PATENT DOCUMENTS

| | | | |
|---|---|---|---|
| 4,458,318 | 7/1984 | Smit et al. ........................... | 474/28 X |
| 4,459,879 | 7/1984 | Miki et al. ........................... | 474/28 X |
| 4,470,117 | 9/1984 | Miki et al. ........................... | 474/18 X |
| 4,509,125 | 4/1985 | Fattic et al. ......................... | 474/18 X |
| 4,536,171 | 8/1985 | Tanaka et al. ...................... | 474/18 X |
| 4,547,178 | 10/1985 | Hayakawa et al. ................ | 474/28 X |

*Primary Examiner*—Stephen J. Novosad
*Assistant Examiner*—Thuy M. Bui
*Attorney, Agent, or Firm*—Parkhurst & Oliff

[57] ABSTRACT

A hydraulic pressure control apparatus for a continuously variable transmission. A hydraulic pressure, which is supplied to a cylinder of an output disc, is controlled to be a minimum value while obtaining a necessary torque to transfer between a belt and discs.

16 Claims, 11 Drawing Figures

Fig. 11

HYDRAULIC PRESSURE CONTROL APPARATUS FOR A CONTINUOUSLY VARIABLE TRANSMISSION

BACKGROUND OF THE INVENTION

The present invention relates to a hydraulic pressure control apparatus for a continuously variable transmission, and particularly to an apparatus for controlling a line pressure supplied to a hydraulic cylinder of an input disc of a continuously variable transmission.

A continuously variable transmission has been proposed in which speed ratios between an input disc and an output disc, are controlled to obtain minimum fuel consumption while achieving a requisite horsepower. Such a continuously variable transmission comprises a pair of input discs, a pair of output discs, and a belt member spanning the input and output discs. A line pressure, which is supplied to a hydraulic cylinder of the output disc, is controlled according to the amount of the torque transferred between the input and output discs. Speed ratios of the continuously variable transmission are controlled by a hydraulic pressure of a cylinder of the input disc. A line pressure, which is controlled by a regulator valve, is supplied to a hydraulic cylinder of the output disc. If the value of the line pressure is too small, compared with the appropriate values necessary to transfer the torque between the input and output discs, the belt spanning the input and output discs begins slipping on the discs, thereby resulting in an inability to transfer the torque between the belt and discs. Conversely, if the value of the line pressure is too large, compared with the appropriate values, the endurance of the continuously variable transmission is shortened, and power consumed by an oil pump is lost. It is theoretically possible to obtain an optimum line pressure control if the value of the coefficient of friction on the contact surface of the belt with the discs is clarified, but the coefficient of friction varies according to oil temperature, worn belt conditions, and rotating speeds of the discs.

SUMMARY OF THE INVENTION

The present invention was developed in view of the foregoing background and to overcome the foregoing drawbacks. It is therefore an object of this invention to provide a hydraulic pressure control apparatus for a continuously variable transmission, whose pressure value is controlled to be as small as possible.

To attain the above objects, a hydraulic control apparatus for a continuously variable transmission is provided, which according to the present invention, comprises:
means for detecting a pressure of hydraulic cylinders of a driving pulley and a driven pulley;
means for memorizing a first zone and a second zone;
means for comparing the detected hydraulic pressures of the driving and driven pulleys with data memorized in the first and second zones; and
means for decreasing the pressure of the hydraulic cylinder of the driven pulley when the detected pressures of the cylinders of the driving input and driven pulleys are in a range within the first zone, or for increasing the pressure of the cylinder of the driven pulley when the detected pressures of the hydraulic cylinders of the driving and driven pulleys are in a range within the second zone.

The above objects, features and advantages of the present invention will become more apparent from the following description of the preferred embodiments taken in conjunction with the accompanying drawings.

DETAILED DESCRIPTION OF THE PREFERRED EMBODIMENTS

The present invention is described in detail with reference to the accompanying drawings which illustrate different embodiments of the present invention.

Figure 1:
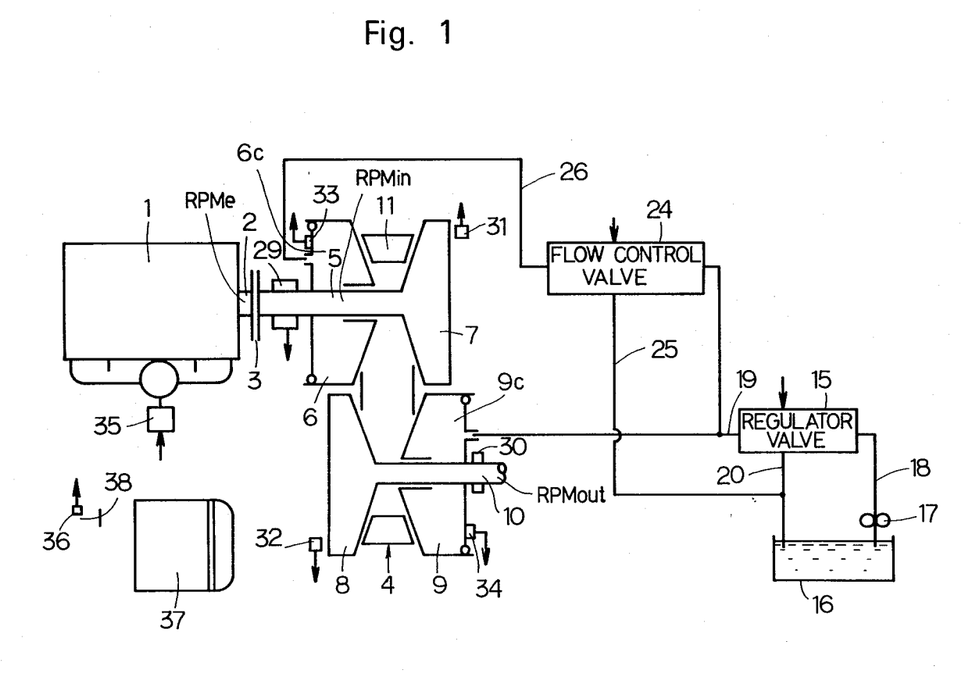
FIG. 1 is a schematic view of a continuously variable transmission in which the hydraulic pressure control apparatus according to the present invention is utilized.

FIG. 1 illustrates a schematic view of a continuously variable transmission in which the hydraulic pressure control apparatus according to the present invention is utilized. An engine 1 is connected through a crank shaft 2 and a clutch 3 with a shaft 5. The shaft 5 is an input shaft connected with a continuously variable transmission (hereinafter referred to as CVT) 4. The CVT 4 comprises input discs 6, 7 and output discs 8, 9. The discs 6 and 7 constitute a driving pulley mounted on the driving and input shaft 5 which is driven by the engine 1. The output discs 8 and 9 constitute a driven pulley mounted on a driven and output shaft 10. The torque of the shaft 10 is outputted to wheels of a vehicle or the like. A torque transmitting continuous V-belt 11 extends between the discs 6, 7 and 8, 9. The input discs 6 and 7 comprise a movable member 6, which is axially displaced on and rotates with the input shaft 5, and a member 7, which is fixed to and rotates with the input shaft 5. The movable member 6 is axially displaced by the pressure exerted upon it by a hydraulic cylinder 6c. When the movable member 6 is axially displaced in a direction toward the opposite member 7, the width between the members 6 and 7 is decreased. This results in an increase in the effective diameter of the input discs 6 and 7. As a result, the RPM ratio "e", i.e., (the rotating speed or RPM of the output discs 8, 9)/(the rotating speed or RPM of the input discs 6, 7), ($RPM_{out}/RPM_{in}$) is increased. The $RPM_{in}$ is governed by the engine speed $RPM_e$.

Similarly, the output discs comprise a movable member 9, which is axially displaced on and rotates with the output shaft 10, and a non-movable member 8, which is fixed to and rotates with the output shaft 10. The movable member 9 is axially displaced by the pressure exerted upon it by a hydraulic cylinder 9c. When the movable member 9 is axially displaced in a direction toward the opposite member 8, the width between the members 8 and 9 is decreased. This results in an increase in the effective diameter of the output discs 8, 9.

To minimize the amount of engine power consumed by a hydraulic fluid pump 17, the hydraulic pressure in the cylinder 9c of the output disc is controlled to be as small as possible while a torque is transmitted from the input discs 6, 7 to the output discs 8, 9. The hydraulic pressure of the cylinder 6c is varied to adjust the speed ratios. The value of hydraulic pressure in the cylinder 6c is designed to be smaller than that of the hydraulic pressure in the cylinder 9c. However, even though the value of the hydraulic pressure supplied to the cylinder 6c is less than that of the pressure supplied to the cylinder 9c, the system is designed so that a greater overall hydraulic pressure is realized in the cylinder 6c than in the cylinder 9c because the total area of the cylinder 6c exerted on with the hydraulic pressure is bigger than that of the cylinder 9c. Hence, it is possible to obtain a RPM ratio of more than or at least equal to one. The CVT 4 is supplied with the hydraulic fluid by the following procedure:

The hydraulic fluid pump 17, driven by a motor, pumps hydraulic fluid from a reservoir 16 into a passage 18. A regulator valve 15 controls the pressure supplied to a passage 19 by adjusting an amount of fluid drained from the system, thereby generating a specific line pressure in the passage 19. The regulator valve 15 supplies the line pressure through the passage 19 to the hydraulic cylinder 9c of the output discs 8, 9 and to a flow control valve 24. The flow control valve 24 is a three port connection valve, and includes an inlet port communicated with the passage 19, a drain port communicated with a drain passage 25 and an outlet port communicated through a passage 26 with the hydraulic cylinder 6c of the input discs 6, 7. When the flow control valve 24 is in a first position, the inlet port communicates with the outlet port. When the flow control valve 24 is in a second position, there is no communication between the three ports. Finally, when the flow control valve 24 is in a third position, the outlet port communicates with the drain port.

A torque sensor 29 detects a torque $T_{in}$ of the input shaft 5 from the change of the magnetic field. A torque sensor 30 detects a torque $T_{out}$ of the output shaft 10 from the change of the magnetic field. A rotated angle sensor 31 detects the rotating speed $RPM_{in}$ of the input disc 7. A rotated angle sensor 32 detects the rotating speed $RPM_{out}$ of the output disc 8. Hydraulic pressure sensors 33 and 34 detect the hydraulic pressures $P_{in}$ and $P_{out}$ (=P1) of the input disc and the output disc, respectively. A throttle actuator 35 controls the opening of an intake throttle valve. An accelerator pedal 36 detects the stroke of a depressed accelerator pedal 38 mounted adjacent a passenger seat 37.

A requisite horsepower is predetermined to be a function of the stroke of the depressed accelerator pedal 38. A desired engine torque and a desired engine speed are predetermined to be a function of a requisite horsepower. The opening of the intake throttle valve is controlled in such a condition as the opening of the intake throttle valve is a function of a desired torque. The speed ratio of the CVT 4 is controlled in such a condition as the speed ratio of the CVT 4 is a function of the desired engine speed.

Figure 2:
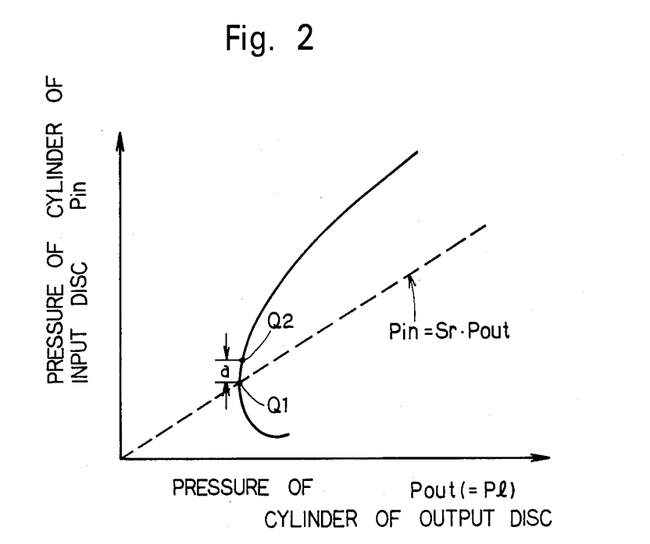
FIG. 2 is a graph which shows a relationship between a hydraulic pressure of a cylinder of a driving pulley and a hydraulic pressure of a cylinder of a driven pulley.

FIG. 2 illustrates a relation between a hydraulic pressure $P_{in}$ of a cylinder of an input disc and a hydraulic pressure $P_{out}$ of a cylinder of an output disc. The following relation is obtained between the hydraulic pressure $P_{in}$ of the input disc 6 and the hydraulic pressure $P_{out}$ of the output disc 9.

$$P_{in}/P_{out}=Sr \tag{1}$$

Where, Sr is defined as following equation:

$$Sr=(A_{out}\cdot\phi_{in})/(A_{in}\cdot\phi_{out}) \tag{2}$$

Figure 3:
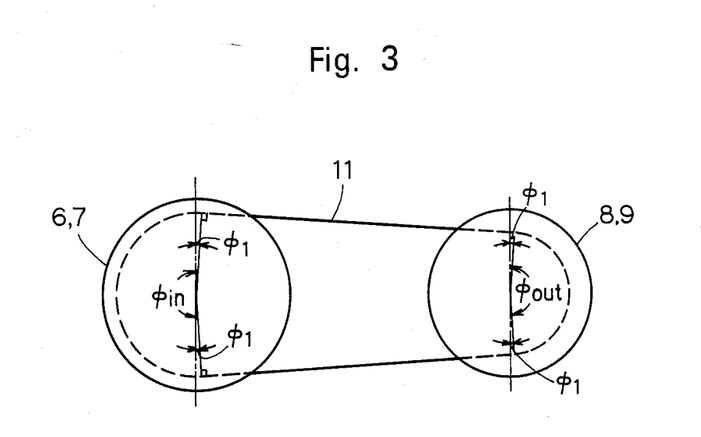
FIG. 3 is a view which schematically shows total arcs of belt contact with discs.

Where, $A_{out}$: the area of the cylinder of the output disc, on which a hydraulic pressure is exerted, $A_{in}$: the area of the cylinder of the input disc, on which a hydraulic pressure is exerted, $\phi_{in}$: the total arc of belt contact on the input discs $\phi_{out}$: the total arc of belt contact on the output discs $\phi_{in}$ and $\phi_{out}$ are schematically illustrated in FIG. 3, and have the following relation:

$$\phi_{in}=\pi+2\phi_1 \tag{3}$$

$$\phi_{out}=\pi-2\phi_1 \tag{4}$$

Where, $\phi_1$ is illustrated in FIG. 3. The actual relation between $P_{in}$ and $P_{out}$ is not realized according to the above-described equation (1) because of the characteristics of the belt 11. The actual relation between $P_{in}$ and $P_{out}$ is realized as shown by the solid line in FIG. 2. When the pressure P1 (=$P_{out}$) is a high value, $P_{in}$ is positioned in the area above the line ($P_{in}=Sr\cdot P_{out}$). When the value of the line pressure P1 (=$P_{out}$) decreases and reaches to the area corresponding to the line ($P_{in}=Sr\cdot P_{out}$), the belt 11 commences to slip on discs. According to the present embodiment, the line pressure P1 is maintained to have a value of a point Q2 shown in FIG. 2. The point Q2 is on the solid line shown in FIG. 2, and has a larger value by the amount "a" shown in FIG. 2 than that of a point Q1 ($P_{in}=Sr\cdot P_{out}$).

Figure 4:
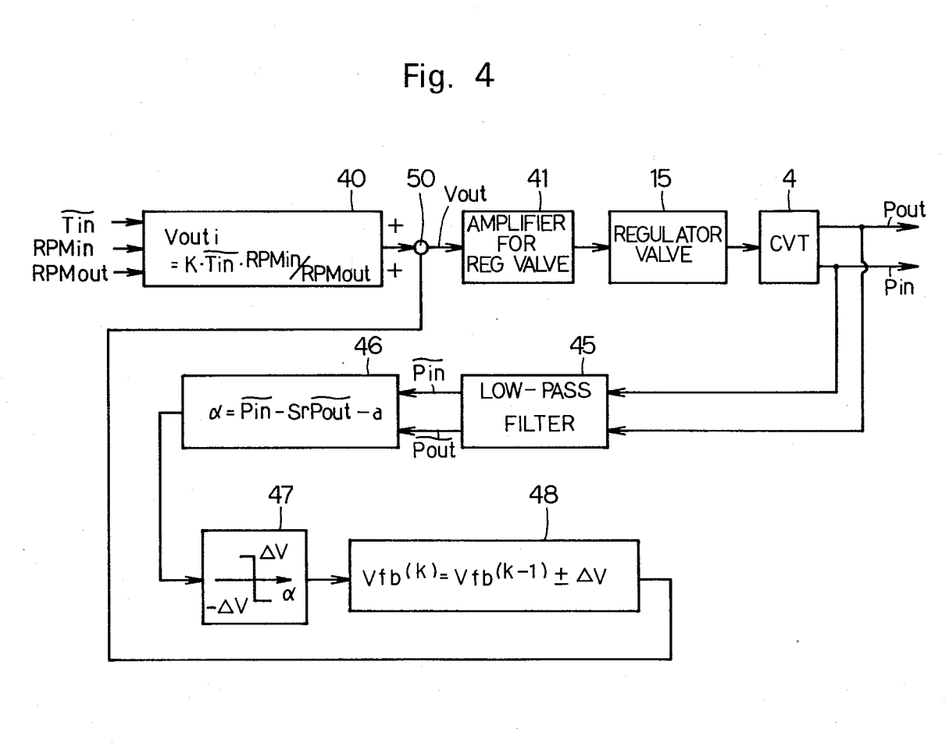
FIG. 4 is a block diagram of a first embodiment of the present invention.

FIG. 4 shows a block diagram of a first embodiment of the present invention. In block 40, an initial value $V_{outi}$ of an input voltage $V_{out}$ to an amplifier for the regulator valve 15 is calculated from $\tilde{T}_{in}$, $RPM_{in}$ and $RPM_{out}$. The initial input voltage $V_{out}$ is defined as following equation:

$$V_{outi}=K\cdot\tilde{T}_{in}\cdot(RPM_{in}/RPM_{out}) \tag{5}$$

Where,

K: a constant $\tilde{T}_{in}$: a direct current component of torque $T_{in}$ of input discs 6 and 7

Figure 5:
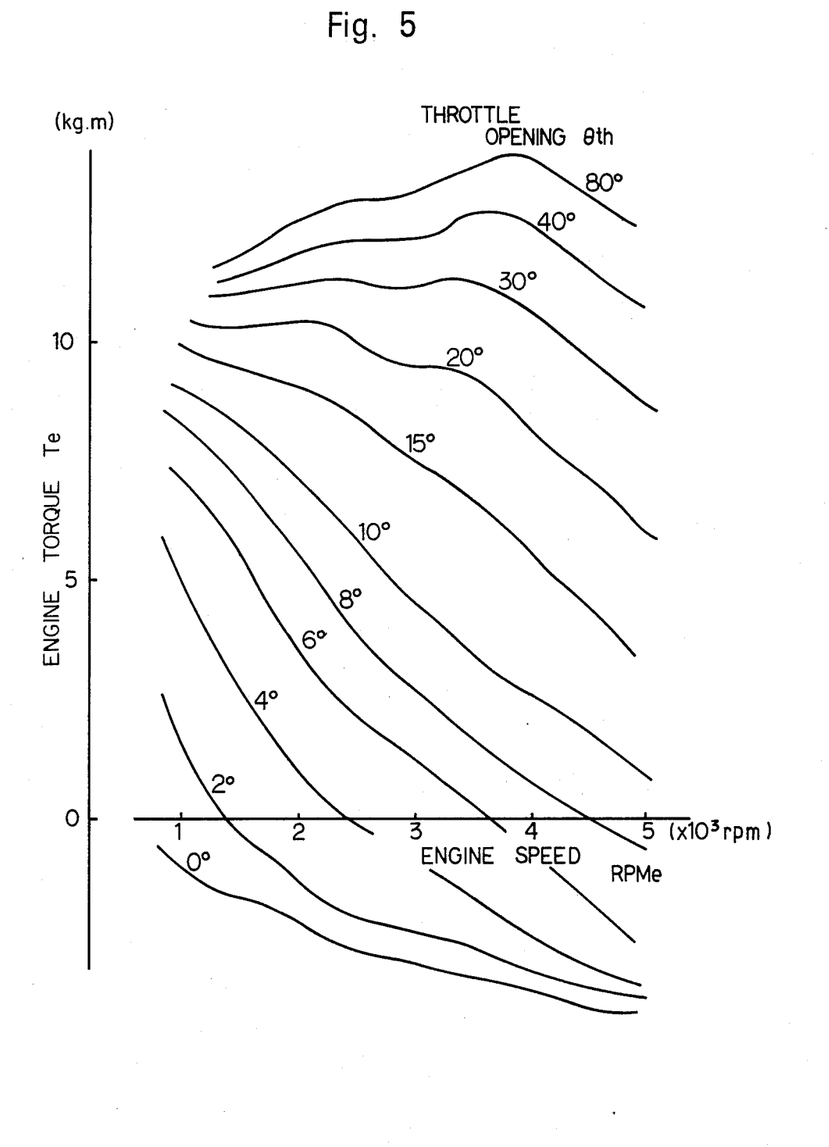
FIG. 5 is a graph which shows the relationship between an engine torque and an engine speed.

As the torque $T_{in}$ of the input discs 6 and 7, which is equal to the engine torque $T_e$, is a function of the engine speed $RPM_e$ (=the rotating speed $RPM_{in}$ of the input disc) and a throttle opening $\phi$ th as shown in FIG. 5, the torque $T_{in}$ of the input discs 6 and 7 can be calculated from an engine speed $RPM_e$ and a throttle opening $\phi$ th instead of directly detecting the torque $T_{in}$ from the output of the input disc torque sensor 29. The output of the amplifier 41 is inputted to the regulator valve 15. A low-pass filter 45 detects the direct current components $\tilde{P}_{in}$ and $\tilde{P}_{out}$ of the pressure $P_{in}$ and the $P_{out}$, respectively. In block 46, $\alpha$ is calculated from the following equation:

$$\alpha = \tilde{P}_{in} - S_r\tilde{P}_{out} - a \qquad (6)$$

In block 47, when a $\alpha$ is more than or equal to zero, $\Delta V$ is selected. When is negative, $-\Delta V$ is selected. In block 48, the amount of a kth feed-back is calculated from the following equation:

$$V_{fb}{}^{(k)} = V_{fb}{}^{(k-1)} \pm \Delta V \qquad (7)$$

Where, $V_{fb}{}^{(k-1)}$ is the amount of a previous feed-back. At a point 50, the sum of $V_{outi}$ and $V_{fb}{}^{(k)}$ is calculated, and the sum, which becomes output voltage $V_{out}$, is inputted to the amplifier 41 for the regulator valve 15.

As apparent from the above description, when $\alpha$ is more than or equal to zero, $V_{out}$ is decreased by the amount $\Delta V$. In other words, when $P_{in}$ positions points above the point Q2 of the characteristic solid line, the line pressure P1 is decreased by the amount $\Delta P1$. Conversely, when $\alpha$ is negative, $V_{out}$ is increased by the amount $\Delta V$. In other wards, when $P_{in}$ positions a point under the Q2, the line pressure P1 is increased by the amount $\Delta V$. Thus, the line pressure P1 is maintained to have the line pressure at the point Q2, which is substantially minimum line pressure with which a belt is prevented from being slipped.

Figure 6:
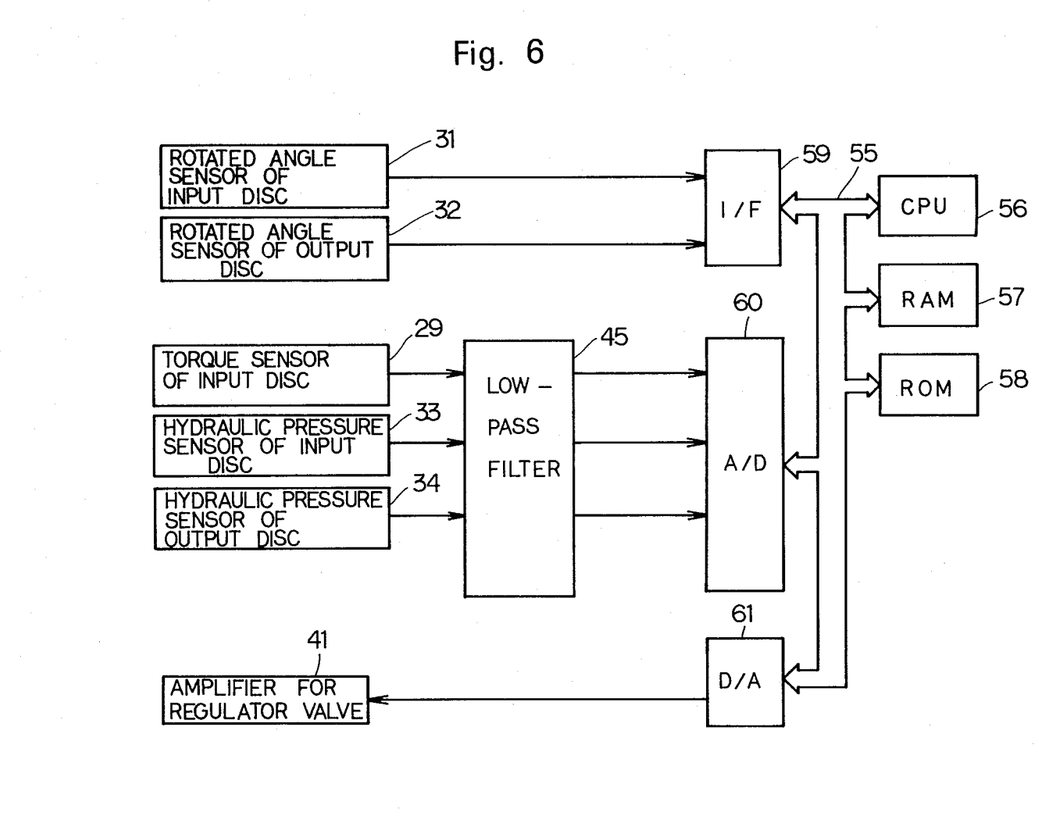
FIG. 6 is a circuit diagram of an electronic control unit employed in a first embodiment of the present invention.

An ECU controls the regulator valve 15 and the flow control valve 24 in accordance with the signals detected by the various sensors. FIG. 6 shows that the ECU functions as a digital computer and comprises a central processing unit (hereinafter referred to as CPU) 56 which carries out arithmetic and logic processing functions, a random-access memory (hereinafter referred to as RAM) 57 which temporarily stores the calculated data of the CPU 56, a read-only memory (hereinafter referred to as ROM) 58 which stores a predetermined control program and arithmetic constants therein, an interface (hereinafter referred to as I/F) 59, an analog-digital converter (hereinafter referred to as A/D) 60, and a digital-analog converter (hereinafter referred to as D/A) 61. These elements are connected by a bus 55. An example of how the ECU functions is given by the following manner: The I/F 59 receives an output signal from the sensor 31 for detecting a rotated angle sensor of the input disc, and an output signal from the sensor 32 for detecting a rotated angle sensor of the output disc. The A/D 60 receives output signals from the torque sensor 29 of the input disc, the hydraulic pressure sensor 33 of the input disc and the hydraulic pressure sensor 34 of the output disc through the low-pass filter 45. The A/D 60 converts the analog direct current components $\tilde{T}_{in}$, $\tilde{P}_{in}$ and $\tilde{P}_{out}$ of the input disc torque $T_{in}$, the input disc hydraulic pressure $P_{in}$ and the output disc hydraulic pressure $P_{out}$ into digital components, respectively. The CPU 56, a microprocessor, then compares the outputs received against any stored information and issues an output voltage $V_{out}$ to the D/A 61 which subsequently outputs any appropriate instructions to the amplifier 41 for the regulator valve 15.

If the input disc torque $T_{in}$ is calculated from the throttle opening $\theta$th and the engine speed $RPM_e$, the torque sensor 29 of the input disc can be omitted. In this case, the throttle opening $\theta$th corresponds to the output signal to the throttle actuator 35, and is a function of the stroke of the accelerator pedal 38.

Figure 7:
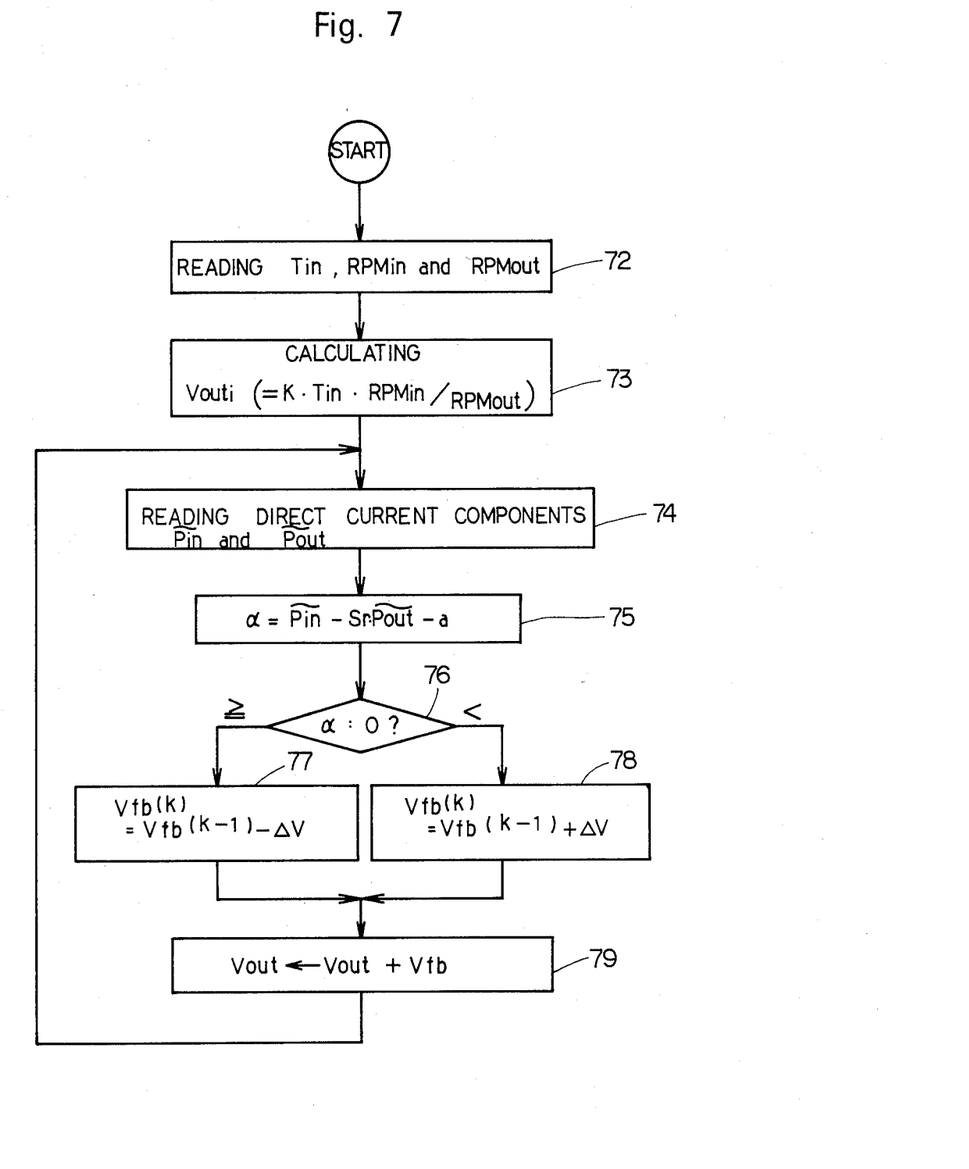
FIG. 7 is a flow chart illustrating operations according to the first embodiment of the present invention.

FIG. 7 shows a flow chart illustrating the operation of the program according to the first embodiment of the present invention. This program is an interruption program which is performed after a prescribed timing signal is issued. The ECU commences the operation when the vehicle's main power switch is turned on. First step 72 reads the input disc torque $T_{in}$, the rotating speed $RPM_{in}$ of the input discs, and the rotating speed $RPM_{out}$ of the output discs. If the torque sensor 29 of the input disc is not provided and it is impossible to directly read the input disc torque $T_{in}$, the throttle opening $\theta$th and the engine speed $RPM_e$ ($= RPM_{in}$) are read and the input disc torque $T_{in}$ is calculated from such a relation as the input disc torque $T_{in}$ is a function of the throttle opening $\theta$th and the engine speed $RPM_e$. In step 73, the initial voltage $V_{outi}$ inputted to the amplifier 41, is calculated. Step 74 reads the direct current components $\tilde{P}_{in}$, $\tilde{P}_{out}$ of the input disc hydraulic pressure $P_{in}$ and the output disc hydraulic pressure $P_{out}$, respectively. In step 75, $\alpha(=\tilde{P}_{in}-S_r\cdot\tilde{P}_{out}-a)$ is calculated. In step 76, it is determined whether or not $\alpha$ is positive. If $\alpha$ is more than or equal to zero, the program prodeeds to step 77. If $\alpha$ is negative, the program proceeds to step 78. In step 77, $V_{fb}$ is subtracted by the amount $\Delta V$, compared with the previous value $V_{fb}{}^{(k-1)}$, and $V_{fb}{}^{(k)}$ is obtained. In step 78, $V_{fb}$ is increased by the amount $\Delta V$, compared with the previous value $V_{fb}{}^{(K-1)}$. In step 79, $(V_{out}+V_{fb})$ is substituted for $V_{out}$. Next, the program returns to step 74.

Thus, according to the first embodiment of the present invention, the point where the slip is occurred between the belt and discs is detected from the relation between the input disc hydraulic pressure $P_{in}$ and the output disc hydraulic pressure $P_{out}$. The line pressure of the CVT can be controlled to be a substantially minimum value while the torque necessary to be transferred between the belt and discs is obtained. Further, the torque sensor $T_{in}$ of the input disc is necessitated only when the initial voltage $V_{outi}$ for controlling the value of the line pressure is determined. After the value of the line pressure is obtained, the values detected by the input disc torque sensor are not necessitated.

Figure 8:
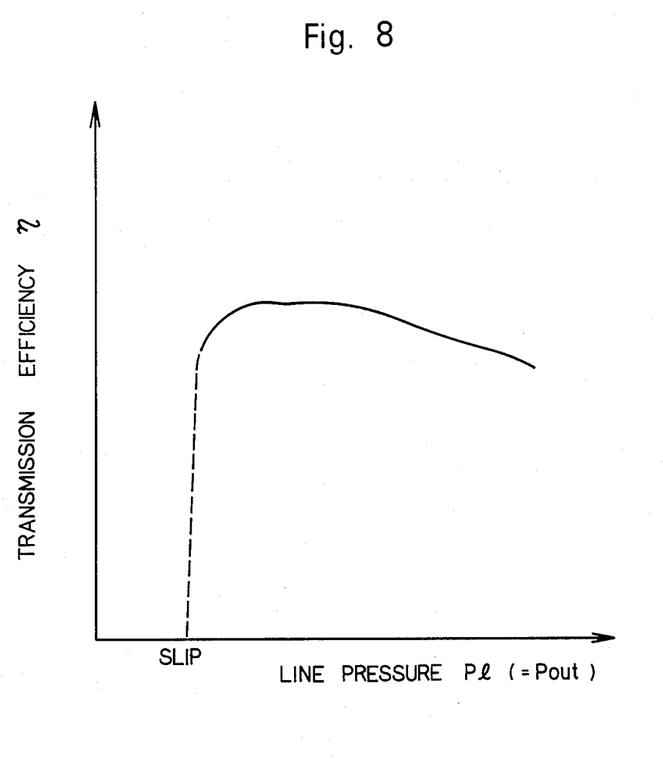
FIG. 8 is a graph illustrating the relation between a transmission efficiency and a line pressure.

FIG. 8 shows a graph illustrating the relation between a transmission efficiency $\eta$ and a line pressure P1, according to the second embodiment of the present invention.

The transmission efficiency $\eta$ is calculated from the following equation:

$$\eta = (RPM_{out}\cdot\tilde{T}_{out})/(RPM_{in}\cdot\tilde{T}_{in}) \qquad (8)$$

Where, $RPM_{out}$: the rotating speed of the output discs 8 and 9

$RPM_{in}$: the rotating speed of the input discs 6 and 7

$\tilde{T}_{out}$: the direct current component of the torque $T_{out}$ of the output discs 8 and 9

$\tilde{T}_{in}$: the direct current component of the torque $T_{in}$ of the input discs 6 and 7

As shown in FIG. 8, the transmission efficiency $\eta$ gradually increases as the line pressure P1 (=the output disc hydraulic pressure $P_{out}$) decreases. After the transmission efficiency $\eta$ exceeds its peak value, the transmission efficiency $\eta$ rapidly decreases as the line pressure P1 decreases. This results in the occurrence of the slip (shown by a broken line in FIG. 8) of the belt 11 on the discs. The peak value of the efficiency $\eta$ is positioned at a point close to another point where the slip commences to be occurred. Hence, if the line pressure P1 is controlled so that the efficiency η is positioned at a point close to the point of the peak value, the line pressure P1 can be maintained to be a substantially minimum value while the value necessary to transfer the torque between the belt and the discs is obtained. According to the second embodiment of the pesent invention, the line pressure P1 is controlled so that the efficiency η may be positioned at a range adjacent to the point of the peak value.

Figure 9:
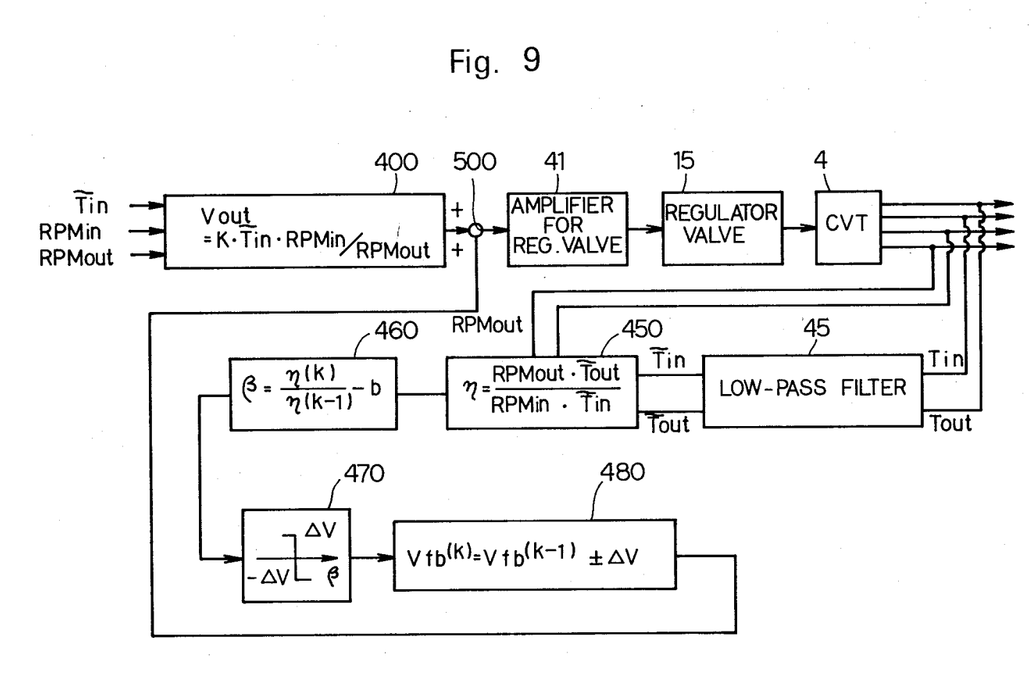
FIG. 9 is a block diagram of a second embodiment of the present invention.

FIG. 9 shows a block diagram of the second embodiment of the present invention. In block 400, an input voltage $V_{out}$ to the amplifier 41 is calculated by the following relation:

$$V_{out} = K \cdot \widetilde{T}_{in} \cdot (RPM_{in}/RPM_{out}) \tag{9}$$

Where, K: a constant

Thus calculated $V_{out}$ becomes the initial value of $V_{out}$. The low-pass filter 45 issues the direct current components $\widetilde{T}_{in}$ and $\widetilde{T}_{out}$ to block 450. In block 450, the transmission efficiency η is calculated by the following relation:

$$\eta = (RPM_{out} \cdot \widetilde{T}_{out})/(RPM_{in} \cdot \widetilde{T}_{in}) \tag{10}$$

In block 460, β is calculated by the following relation:

$$\beta = (\eta^{(k)}/\eta^{(k-1)}) - b \tag{11}$$

Where,
  $\eta^{(k)}$: the present transmission efficiency
  $\eta^{(k-1)}$: the previously calculated transmission efficiency
  b: a constant (for instance, 1)

In block 470, when β is negative, $-\Delta V$ is selected as an amended amount. When is more than or equal to zero, $\Delta V$ is selected as an amended amount. If the constant b is equal to 1, $-\Delta V$ is selected when the present transmission efficiency η has the larger value than that of the previously calculated transmission efficiency, and $\Delta V$ is selected when the present transmission efficiency η has the smaller value than that of the previously calculated transmission efficiency. In block 480, $(V_{fb}^{(k-1)} \pm \Delta V)$ is substituted for $V_{fb}^{(k)}$. Here, $V_{fb}^{(k)}$ is the present amount of feed-back, and $V_{fb}^{(k-1)}$ is the previous amount of feed-back. The value $(V_{out} + V_{fb}^{(k)})$ is substituted for $V_{out}$ at a point 500. Thus, calculated $V_{out}$ is inputted to the amplifier 41. The line pressure P1 increases as $V_{out}$ increases. When the constant b is equal to 1 or is nearly equal to 1, β is negative (β<0) and the line pressure P1 is increased. When β is positive (β>0) and the line pressure P1 is decreased. As a result, the line pressure P1 is controlled to have the value corresponding to the point where β is equal to zero and the transmission efficiency η has the value close to that of the peak point.

Figure 10:
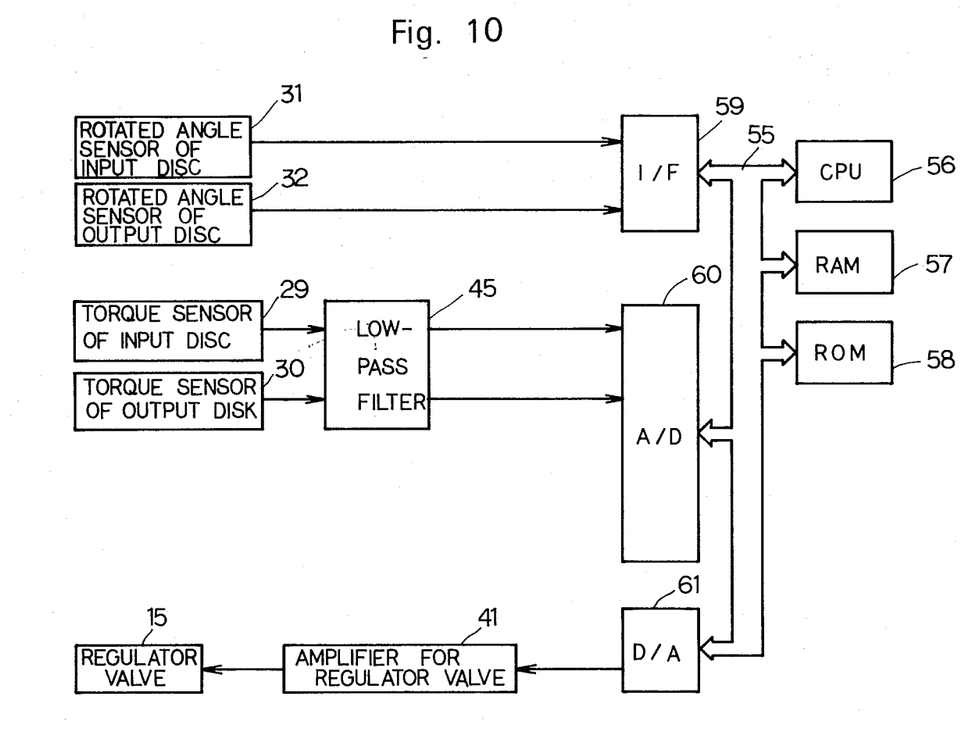
FIG. 10 is a circuit diagram of an electronic control unit employed in a second embodiment of the present invention.

FIG. 10 shows the ECU functions as a digital computer and comprises CPU 56 which carries out arithmetic and logic processing functions, RAM 57 which temporarily stores the calculated data of CPU 56, ROM 58 which stores a predetermined control program and arithmetic constants therein, I/F 59, A/D 60, and D/A 61. An example of how the ECU functions is given by the following manner: The I/F 59 receives output signals from the sensors 31 and 32. The A/D 60 receives output signals from the torque sensor 29 of the input disc, and the torque sensor 30 of the output disc through the low-pass filter 45. The A/D 60 converts the analog direct current components $\widetilde{T}_{in}$ and $\widetilde{T}_{out}$ of the input disc torque $T_{in}$ and the output disc torque $T_{out}$ into the digital components. The CPU 56, a microprocessor then compares the outputs received against any stored information and issues an output voltage $V_{out}$ to the D/A 61 which subsequently outputs any appropriate instructions to the amplifier 41. The amplifier 41 issues an output signal to the regulator valve 15.

Figure 11:
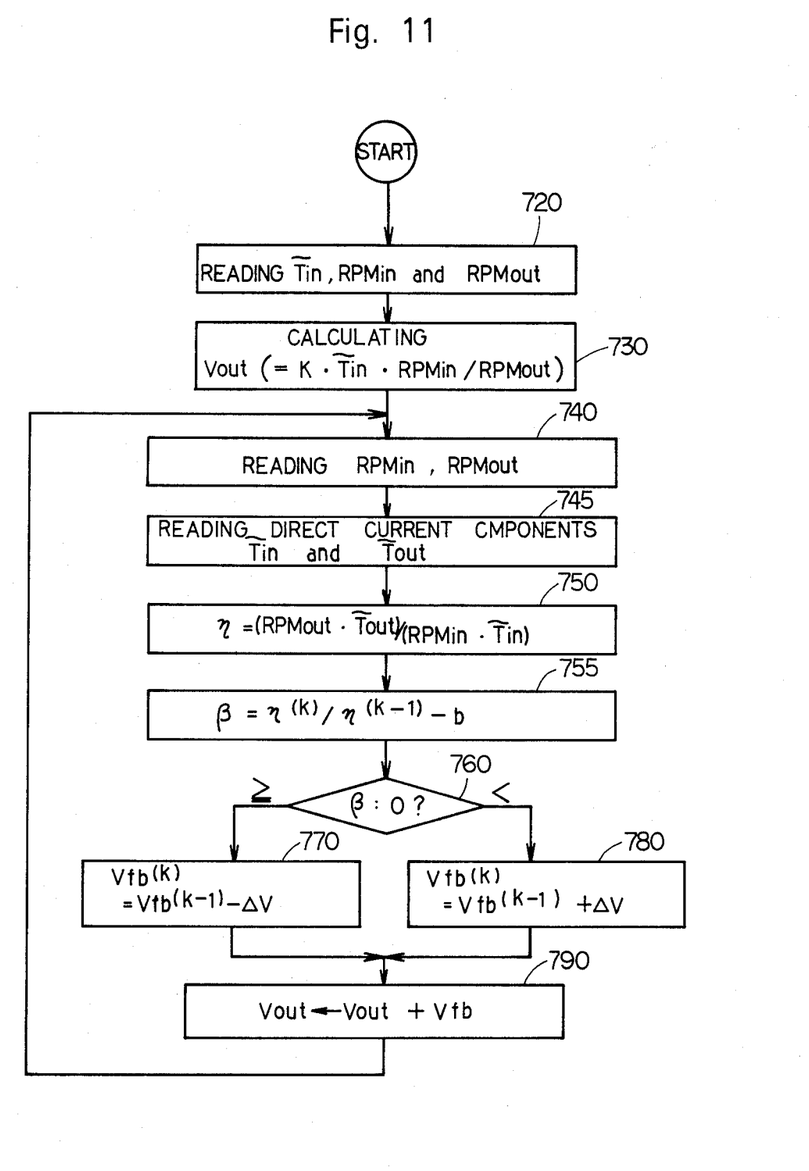
FIG. 11 is a flow chart illustrating operations according to the second embodiment of the present invention.

FIG. 11 shows a flow chart illustrating the operation of the program according to the second embodiment of the present invention. This program is an interruption program which is performed after a prescribed timing signal is issued. The ECU commences the operation when the vehicle's main power switch is turned on. First step 720 reads the direct current component $\widetilde{T}_{in}$ of the input disc torque, the rotating speed $RPM_{in}$ of the input disc, and the rotating speed $RPM_{out}$ of the output disc. In step 730, the input voltage $V_{out}$ to the amplifier 41 is calculated by the following relation:

$$V_{out} = K \cdot \widetilde{T}_{in} \cdot (RPM_{in}/RPM_{out}) \tag{12}$$

The calculated voltage $V_{out}$ in step 730 becomes the initial value of $V_{out}$. In step 740, $RPM_{in}$, and $RPM_{out}$, are read. In step 745, the direct current components $\widetilde{T}_{in}$ and $\widetilde{T}_{out}$ of $T_{in}$ and $T_{out}$ are detected, respectively. In step 750, the transmission efficiency η is calculated by the following relation:

$$\eta = (RPM_{out} \cdot \widetilde{T}_{out})/(RPM_{in} \cdot \widetilde{T}_{in}) \tag{13}$$

In step 755, β is calculated by the following relation:

$$\beta = (\eta^{(k)}/\eta^{(k-1)}) - b \tag{14}$$

In step 760, β is compared with zero. If β is more than or equal to zero (β≧0), the program proceeds to step 770. If β is less than zero (β<0), the program proceeds to step 780. In step 770, $(V_{fb}^{(k-1)} - \Delta V)$ is substituted for $V_{fb}^{(k)}$. In step 780, $(V_{fb}^{(k-1)} + \Delta V)$ is substituted for $V_{fb}^{(k)}$. In step 790, $(V_{out} + V_{fb})$ is substituted for $V_{out}$, and the program returns to step 740.

Thus, according to the second embodiment of the present invention, the line pressure P1 is controlled to be a minimum value in the condition that a slip between the belt and the discs is not generated, in view that the line pressure around the point, which the belt of the CVT commences to slip on discs, can be detected by the transmission efficiency of the CVT.

While the present invention has been described in its preferred embodiments, it is to be understood that the invention is not limited thereto, and may be otherwise embodied within the scope of the following claims.

What is claimed is:

1. A hydraulic pressure control apparatus for a continuously variable transmission, the transmission including a driving pulley having a fixed member and a movable member, the movable member being actuated by a hydraulic cylinder to form a V-shaped opening between the movable member and the fixed member, a driven pulley having another fixed member and another movable member, said another movable member being similarly actuated by another hydraulic cylinder to form a similar V-shaped opening between said another movable member and said another fixed member, and a belt member spanning said driving and driven pulleys such that an effective diameter of the driving and driven pulleys can be varied with respect to each other to obtain different speed ratios, the hydraulic pressure control apparatus comprising:

a first pressure detecting means in communication with the hydraulic cylinder of the driving pulley for detecting a pressure of the hydraulic cylinder of the driving pulleys, the first pressure detecting means outputting a first pressure signal having a first value;

a second pressure detecting means in communication with another hydraulic cylinder of the driven pulley for detecting the pressure of said another hydraulic cylinder of the driven pulley, the second pressure detecting means outputting a second pressure signal having a second value;

a storing means for storing a predetermined value;

a calculating means for calculating a third value, said calculatinng means being in communication with said first and second pressure detecting means and said calculating means receiving the first and second pressure signals from the first and second detecting means, said calculating means using said value of said first signal and said value of said second signal to calculate said third value, said calculating means outputting a signal having said third value;

a comparison means for comparing said third value with said predetermined value, said comparison means being in communication with said storing means and said calculating means, the comparison means outputting a resultant signal; and an adjustment means for changing the pressure of the another hydraulic cylinder of the driven pulley in accordance with the resultant signal, said adjustment means being in communication with said another hydraulic cylinder and said comparison means.

2. The apparatus of claim 1, wherein the calculating means calculates the third value in accordance with the following formula:

$$a = \widetilde{P}_{in} - Sr \cdot \widetilde{P}_{out} - a$$

$$Sr = (A_{out} \cdot \phi_{in})/(A_{in} \cdot \phi_{out})$$

Where, $\widetilde{P}_{in}$: the direct current component of the pressure $P_{in}$ of the hydraulic cylinder of the driving pulley $\widetilde{P}_{out}$: the direct current component of the pressure $P_{out}$ of the hydraulic cylinder of the driven pulley a: a constant $A_{in}$: the total area of the cylinder of the driving pulley on which hydraulic pressure is exerted $A_{out}$: the total area of the cylinder of the driven pulley on which hydraulic pressure is exerted $\phi_{in}$: the total arc of belt in contact with the driving pulley $\phi_{out}$: the total arc of belt in contact with the driven pulley 3. The apparatus of claim 2, further comprising:
an input shaft connected to the driving pulley;
a torque detecting means for detecting a torque of said input shaft of the driving pulley;
an input revolution detecting means for detecting an RPM of the driving pulley;
an output revolution detecting means for detecting an RPM of the driven pulley; and
an initial value calculating means for calculating an initial value of the pressure of the hydraulic cylinder of the driven pulley.

4. The apparatus of claim 1, wherein when the comparison means compares said third value with said predetermined value and determines that the third value is greater than the predetermined value, said resultant signal has a fourth value, and said adjustment means decreases the pressure of the hydraulic cylinder of the driven pulley.

5. The apparatus of claim 1, wherein when the comparison means compares said third value with said predetermined value and determines that the third value is less than the predetermined value, said resultant signal has a fifth value, and said adjustment means increases the pressure of the hydraulic cylinder of the driven pulley.

6. The apparatus of claim 1, further comprising:
a throttle position detecting means for detecting a value of a throttle opening;
an input revolution detecting means for detecting an RPM of the driving pulley;
an output revolution detecting means for detecting an RPM of the driven pulley; and
an initial value calculating means for calculating an initial value of the pressure of the hydraulic cylinder of the driven pulley.

7. The apparatus of claim 6, wherein said initial value of the pressure of the hydraulic cylinder of the driven pulley is calculated in accordance with the following formula:

$$P_i = f(\theta, RPM_{in}) \cdot (ROM_{in}/RPM_{out})$$

where, $\theta$: the detected value of the throttle opening $P_i$: the initial value of the pressure of the hydraulic cylinder of the driven pulley $RPM_{in}$: the rotating speed of the driving pulley $RPM_{out}$: the rotating speed of the driven pulley.

8. The apparatus of claim 6, wherein the initial value of the pressure of the hydraulic cylinder of the driven pulley is calculated in accordance with the following formula $$P_i = T_{in} \cdot (RPM_{in}/RPM_{out}))$$

Where, $T_{in}$: the torque of the driving pulley $RPM_{in}$: the rotating speed of the driving pulley $RPM_{out}$: the rotating speed of the driven pulley Pi: the initial value of the pressure of the hydraulic cylinder of the driven pulley.

9. A method for controlling a continuously variable transmission for motor vehicles including a driven pulley including a non-movable member and a movable member, the movable member being actuated by a hydraulic cylinder to form a V-shaped opening between the movable member and the non-movable member, a driven pulley including another non-movable member and another movable member, said another movable member being similarly actuated by another hydraulic cylinder to form a V-shaped opening between said another movable member and said another non-movable member, and a belt member spanning the pulleys so that the effective diameter of the pulleys can be varied with respect to each other so that different speed ratios can be obtained, a control unit including a memory means for storing a predetermined value, a detecting means for detecting a pressure of said hydraulic cylinder of the driving pulley and another detecting means for detecting a pressure of said another hydraulic cylinder of said driven pulley, comprising the steps of:
- detecting the pressure of the hydraulic cylinder and of said another hydraulic cylinder;
- calculating a value in accordance with the detected pressures of the hydraulic cylinder and the another hydraulic cylinder;
- comparing the calculated value with the predetermined value stored in the memory means; and
- changing the pressure of the another hydraulic cylinder of the driven pulley in accordance with the result of said comparison.

10. The method of claim 9, wherein when the calculated value is greater than the predetermined value, the pressure of the another hydraulic cylinder of the driven pulley is decreased.

11. The method of claim 9, wherein when the calculated value is less than the predetermined value, the pressure of the another hydraulic cylinder of the driven pulley is increased.

12. The method of claim 9, wherein the calculated value is calculated in accordance with the following formula:

$$\alpha = P_{in} - Sr \cdot P_{out} - a$$

$$Sr = (A_{out} \cdot \phi_{out})/(A_{in} \cdot \phi_{out})$$

Where,
- $P_{in}$: the direct current component of the pressure $P_{in}$ of the hydraulic cylinder of the driving pulley
- $P_{out}$: the direct current component of the pressure $P_{out}$ of the another hydraulic cylinder of the driven pulley
- a: a constant
- $A_{in}$: the total area of the cylinder of the driving pulley which a hydraulic pressure is exerted on
- $A_{out}$: the total area of the cylinder of the driven pulley which a hydraulic pressure is exerted on
- $\phi_{in}$: the total arc of belt in contact with the driving pulley
- $\phi_{out}$: the total arc of belt in contact with the driven pulley.

13. The method of claim 9, wherein the continuously variable transmission further comprises:
- an input shaft connected to said driving pulley;
- a torque detecting means for detecting a torque of said input shaft;
- an input revolution detecting means for detecting an RPM of the driving pulley, an output revolution detecting means for detecting an RPM of the driven pulley; and
- an initial value calculating means for calculating an initial value of the pressure of the hydraulic cylinder of the driven pulley; and wherein the method further comprises:
- calculating an initial value of the pressure of the hydraulic cylinder of the driven pulley.

14. The method of claim 13, wherein the initial value of the pressure of the hydraulic cylinder of the driven pulley is calculated in accordance with the following formula $$P_i = T_{in} \cdot (RPM_{in}/RPM_{out})$$

where,
- $P_i$: the initial value of the pressure of the hydraulic cylinder of the driven pulley
- $RPM_{in}$: the rotating speed of the driving pulley
- $RPM_{out}$: the rotating speed of the driven pulley.

15. The method of claim 9, wherein the continuously variable transmission further comprises:
- a throttle position detecting means for detecting a value of a throttle opening;
- an input revolution detecting means for detecting an RPM of the driving pulley;
- an output revolution detecting means for detecting an RPM of the driven pulley; and
- an initial value calculating means for calculating an initial value of the pressure of said another hydraulic cylinder of the driven pulley; and wherein the method further comprises the step of
- calculating an initial value of the pressure of the hydraulic cylinder of the driven pulley.

16. The method of claim 15, wherein the initial value of the pressure of said another hydraulic cylinder of the driven pulley is calculated in accordance with the following formula $$P_i = f(\theta, RPM, in) \cdot (RMP_{in}/RPM_{out})$$

where,
- $\theta$: the detected value of the throttle opening
- $P_i$: the initial value of the pressure of said another hydraulic cylinder of the driven pulley
- $RPM_{in}$: the rotating speed of the driving pulley
- $RPM_{out}$: the rotating speed of the driven pulley.

* * * * *